US008714313B2

(12) United States Patent
Harkonen et al.

(10) Patent No.: US 8,714,313 B2
(45) Date of Patent: May 6, 2014

(54) ELECTRICAL POWER SYSTEM WITH POWER LIMITING TO NETWORK

(75) Inventors: Ari Harkonen, Riihimaki (FI); Antti Kallioniemi, Jokela (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/557,638

(22) Filed: Jul. 25, 2012

(65) Prior Publication Data

US 2012/0285774 A1  Nov. 15, 2012

Related U.S. Application Data

(63) Continuation of application No. PCT/FI2011/050043, filed on Jan. 21, 2011.

(30) Foreign Application Priority Data

Feb. 10, 2010  (FI) ...................................... 20105129

(51) Int. Cl.
*B66B 1/06* (2006.01)

(52) U.S. Cl.
USPC ........................................ 187/289; 187/391

(58) Field of Classification Search
USPC ................. 187/247, 248, 290–293, 296, 297, 187/391–393; 318/375, 376, 380
See application file for complete search history.

(56) References Cited

U.S. PATENT DOCUMENTS

| 5,894,910 | A * | 4/1999 | Suur-Askola et al. | 187/290 |
| 5,896,948 | A * | 4/1999 | Suur-Askola et al. | 187/290 |
| 6,315,081 | B1 * | 11/2001 | Yeo | 187/290 |
| 6,742,630 | B2 * | 6/2004 | Eilinger | 187/290 |
| 7,012,392 | B2 * | 3/2006 | Nguyen et al. | 318/376 |
| 7,246,686 | B2 * | 7/2007 | Smith et al. | 187/290 |
| 7,375,483 | B2 * | 5/2008 | Edelson | 318/380 |
| 7,681,694 | B2 * | 3/2010 | Aulanko et al. | 187/290 |
| 7,967,113 | B2 * | 6/2011 | Smith et al. | 187/393 |
| 8,083,033 | B2 * | 12/2011 | Kallioniemi et al. | 187/290 |
| 8,146,714 | B2 * | 4/2012 | Blasko | 187/290 |
| 8,172,042 | B2 * | 5/2012 | Wesson et al. | 187/382 |
| 8,220,590 | B2 * | 7/2012 | Chen et al. | 187/290 |
| 2008/0105499 | A1 | 5/2008 | Tyni et al. | |
| 2008/0185234 | A1 | 8/2008 | Harkonen | |
| 2010/0078267 | A1 | 4/2010 | Hashimoto | |

FOREIGN PATENT DOCUMENTS

EP  2112114 A1  10/2009

OTHER PUBLICATIONS

International Search Report and Written Opinion from priority application PCT/FI2011/050043.

* cited by examiner

*Primary Examiner* — Anthony Salata
(74) *Attorney, Agent, or Firm* — Harness, Dickey & Pierce, P.L.C.

(57) ABSTRACT

The invention relates to an electrical power system for operating elevators. The electrical power system includes: an electricity distribution network of a building, which includes an interface to a public electricity network; a plurality of hoisting machines of an elevator, each of which hoisting machines of an elevator is equipped to move an elevator car in an elevator hoistway; and also a power supply system, which includes an interface to the aforementioned hoisting machines of the elevator, and which power supply system includes an interface to the electricity distribution network of the building, for supplying power between the hoisting machines of the elevator and the electricity distribution network of the building.

22 Claims, 4 Drawing Sheets

US 8,714,313 B2

ELECTRICAL POWER SYSTEM WITH POWER LIMITING TO NETWORK

CROSS-REFERENCE TO RELATED APPLICATIONS

This is a Continuation of PCT/FI2011/050043 filed on Jan. 21, 2011, which is an International Application claiming priority from FI 20105129 filed on Feb. 10, 2010; the entire contents of each of which are hereby incorporated by reference.

FIELD OF THE INVENTION

The invention relates to electrical power systems, more particularly in connection with elevators.

BACKGROUND OF THE INVENTION

An elevator car is moved in the elevator hoistway e.g. with suspension ropes traveling via the traction sheave of the hoisting machine of the elevator. When the elevator runs in the heavy direction, the force effect of the hoisting machine of the elevator is parallel with the direction of movement of the suspension ropes of the elevator car that travel on the traction sheave. In this case the hoisting machine of the elevator receives electrical power from the electricity network, e.g. through a frequency converter. When the elevator runs in the light direction, the force effect produced by the hoisting machine of the elevator is instead in the opposite direction with respect to the direction of movement of the suspension ropes traveling on the traction sheave. In this case the hoisting machine of the elevator brakes the movement of the elevator car. The electrical power of the hoisting machine of the elevator produced in motor braking can be returned back to the electricity network e.g. by means of the network inverter rectifier of the frequency converter.

Since the power to be taken from the electricity network/to be returned to the electricity network during the acceleration phase of the heavy drive direction of the elevator and, on the other hand, during the deceleration phase of the light direction of the elevator increases to be very large, a temporary storage for energy comprising e.g. supercapacitors can be added in connection with the frequency converter supplying the hoisting machine of the elevator, which temporary storage supplies and also receives a set part of the total power of the hoisting machine of the elevator. One such solution is presented in publication U.S. Pat. No. 6,742,630 B2.

The power supply particularly in high-powered elevator systems supplying power to the public electricity network is conventionally taken to bypass the electricity distribution network of the building by connecting the elevator system to the public electricity network with its own separate electricity connection. In certain countries the power supply to the public electricity network is billed according to the amount of power to be supplied, in which case the costs of an electricity connection of a high-powered elevator system particularly can be considerable.

SUMMARY OF THE INVENTION

When connecting a number of high-powered elevators to the electricity distribution network of a building, the capacity of the electricity distribution network of the building may run out if a number of elevators are used simultaneously during the acceleration phase of the heavy direction, or if a number of elevators are used simultaneously during the deceleration phase of the light direction. In other words, when examining high-powered elevator systems connected to an electricity distribution network of a building, it has been discovered that there is a special need to further develop the electrical power systems, on the one hand, for better utilizing the capacity of the electricity distribution network of the building and the capacity of the elevator system and also, on the other hand, for improving the dependability and operational reliability of the electricity distribution network of the building and of the elevator system.

The aim of the invention is to disclose a solution to the aforementioned problem. Consequently, the invention discloses an improved electrical power system for operating elevators. Some inventive embodiments and inventive combinations of different embodiments are also presented in the descriptive section and in the drawings of the present application.

The invention relates to an electrical power system for operating elevators. The electrical power system comprises an electricity distribution network of a building, which network comprises an interface to the public electricity network. The electrical power system also comprises a plurality of hoisting machines of an elevator, each of which hoisting machines of an elevator is equipped to move an elevator car in the elevator hoistway. The electrical power system further comprises a power supply system, which comprises an interface to the aforementioned hoisting machines of an elevator, and which power supply system comprises an interface to the electricity distribution network of the building, for supplying power between the hoisting machines of an elevator and the electricity distribution network of the building. In addition, the electrical power system comprises a control apparatus for determining the power-handling capacity, available to the elevators, of the electricity distribution network of the building. The aforementioned power supply system is arranged to limit the net power flowing via the interface between the electricity distribution network of the building and the power supply system to the limit value for net power determined by the power-handling capacity, available to the elevators, of the electricity distribution network of the building. In this case by limiting the flow of net power between the power supply system and the electricity distribution network of the building, exceedance of the power-handling capacity of the electricity distribution network of the building in varying loading situations can be prevented. The power produced by the hoisting machines of an elevator in motor braking can e.g. be supplied via the power supply system to loads that are external to the elevator system and that are connected to the electricity distribution network of the building such as e.g. to air-conditioning devices, lighting, automation systems, escalator systems, and/or travelator systems et cetera. In this case the amount of power to be supplied to the public electricity network decreases. On the other hand, the power to be supplied via the electricity distribution network of the building to the hoisting machines of an elevator can also be limited e.g. by supplying a part of the power requirement of the hoisting machines of the elevator from temporary storages of energy fitted in connection with the power supply system.

The net power flowing via the interface between the electricity distribution network of the building and the power supply system refers to the resultant of the power flow, which resultant when calculated has taken into account the direction and magnitude of the different components of the power flow. Public electricity network refers to an electricity network that is common to a larger entity, such as to several buildings.

In a first preferred embodiment of the invention the power supply system comprises a plurality of power resistors and also a plurality of brake choppers. By switching the brake choppers the power supply is adjusted through a power resistor and therefore a set part of net power flowing from the hoisting machines of an elevator that exceeds the limit value for net power is consumed as heat in the power resistor. When only the part of the braking power of the hoisting machines that exceeds the power-handling capacity, available to the elevators, of the electricity distribution network of the building is consumed as heat in the power resistors, the largest possible part of the braking power can always be supplied to the electricity distribution network of the building, in which case the efficiency ratio of the electrical power system improves. When the heat production of the power resistors decreases, the cooling requirement of the building also decreases.

In a second preferred embodiment of the invention the power supply system comprises a plurality of temporary storages of energy; and the power supply system is arranged to supply the part of the net power flowing from the hoisting machines of an elevator to the power supply system that exceeds the limit value for net power to the temporary storages of energy. In this case the flow of net power directed from the power supply system to the electricity distribution network of the building can be reduced and thus exceedance of the power-handling capacity of the electricity distribution network of the building prevented. A supercapacitor or an accumulator, such as a lithium-ion accumulator, for example, can be used as a temporary storage of energy. The power supply system is further arranged to supply the part of the net power that flows from the power supply system to the hoisting machines of an elevator and that exceeds the limit value for net power from the temporary storages of energy. In this case the flow of net power directed from the electricity distribution network of the building to the power supply system can be reduced and thus exceedance of the power-handling capacity of the electricity distribution network of the building prevented.

In some embodiments of the invention the brake chopper of a first power supply device is arranged to consume the part of the power flowing from a hoisting machine of an elevator to a second power supply device as heat in a power resistor of the first power supply device. In this case the electrical power flowing from the hoisting machine of an elevator to a second power supply device can first be transferred from the second power supply device to the electricity distribution network of the building, and the aforementioned power from the electricity distribution network of the building can be transferred onwards to the first power supply device for consuming as heat. The power supply between the electricity distribution network of the building and the power supply devices preferably occurs in this case with the network inverter rectifier of each power supply device. In some embodiments of the invention the control apparatus is fitted to determine the voltage of the electricity distribution network of the building on the basis of the modulation index of the network inverter rectifier.

In some embodiments of the invention the temporary storage of energy belonging to the first power supply device is arranged to receive the part of the power flowing from a hoisting machine of an elevator to a second power supply device, and also to surrender the part of the power flowing from the second power supply device to a hoisting machine of an elevator. In this case the part of the electrical power flowing between a hoisting machine of an elevator and the second power supply device can be temporarily stored in the temporary storage of energy belonging to the first power supply device by surrendering as well as by receiving the power flowing between the second power supply device and the electricity distribution network of the building via the electricity distribution network of the building with the first power supply device, which reduces the power flow between the public electricity network and the electricity distribution network of the building. The power supply between the electricity distribution network of the building and the power supply devices preferably occurs also in this embodiment of the invention preferably with the network inverter rectifier of each power supply device.

In some embodiments of the invention at least one power supply device comprises a power resistor and a controllable brake chopper; and at least one second power supply device comprises a temporary storage of energy.

In some embodiments of the invention the aforementioned individual limit value for the power supply of a power supply device is determined on the basis of the state of charge of the temporary storage of energy belonging to the power supply device in question such that when the temporary storage of energy is essentially fully charged, the limit value for the power supply directed from the electricity distribution network of the building to the power supply device in question is reduced, and when the energy storage is essentially fully emptied, the limit value for the power supply directed from the electricity distribution network of the building to the power supply device in question is increased, and the limit value for the power supply of at least one second power supply device that belongs to the same electrical power system and is directed from the electricity distribution network of the building to the power supply device, is reduced, preferably such that the limit values for the power supply of the power supply devices belonging to the electrical power system do not in total exceed the limit value for maximum permitted net power.

In some embodiments of the invention the aforementioned individual limit value for the power supply of a power supply device is determined on the basis of the state of charge of the temporary storage of energy belonging to the power supply device in question such that when the temporary storage of energy is essentially fully charged, the limit value for the power supply directed from the power supply device in question to the electricity distribution network of the building is increased, and when the energy storage is essentially fully emptied, the limit value for the power supply directed from the power supply device in question to the electricity distribution network of the building is reduced, and the limit value for the power supply of at least one second power supply device that belongs to the same electrical power system and is directed from the power supply device to the electricity distribution network of the building is increased, preferably such that the limit values for the power supply of the power supply devices belonging to the electrical power system do not in total exceed the limit value for maximum permitted net power.

In some embodiments of the invention the electricity distribution network of the building is fitted to be connected to a reserve power apparatus, preferably to an electric generator during a functional nonconformance, such as an electricity outage, of the public electricity network.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Embodiment 1

Figure 1:
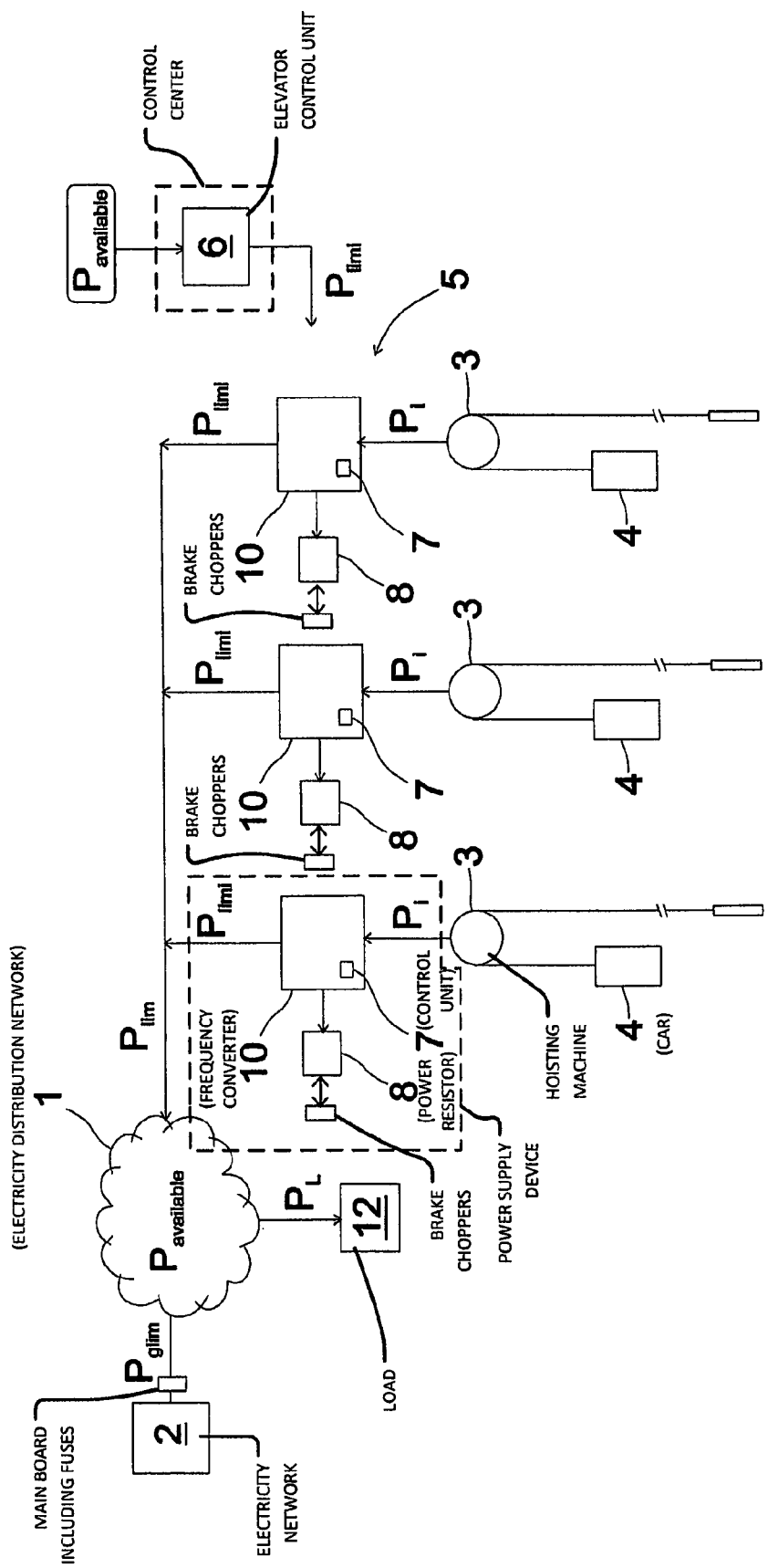
FIG. 1 presents as a block diagram one electrical power system according to a first embodiment of the invention

The electrical power system presented in FIG. 1 comprises a number of high-powered elevators. In each of the elevators an elevator car 4 and a counterweight are suspended in the elevator hoistway with elevator ropes, a belt, or corresponding, passing via the traction sheave of the hoisting machine 3 of an elevator. The elevator car 4 is moved with the hoisting machine 4 of the elevator. An induction motor or synchronous motor, for example, such as a permanent-magnet synchronous motor, in which rotor excitation is implemented with permanent magnets, can be used as the power-producing part of the hoisting machine. The power supply to the aforementioned power-producing part of the hoisting machine 3 of the elevator occurs with frequency converters 10 from the electricity distribution network 1 of the building. Each frequency converter comprises an interface to the hoisting machine 3 of the elevator and to the electricity distribution network 1 of the building. The frequency converters 10 are of the type that brake to the network, and for this reason they comprise a network inverter rectifier. Each of the frequency converters 10 is connected between the hoisting machine 3 of the elevator and the electricity distribution network 1 of the building such that with a frequency converter 10 power can be supplied in both directions between the electricity distribution network 1 of the building and the hoisting machine of the elevator. When the elevator drives in the light direction, power flows from the hoisting machine 3 of the elevator via the inverter of the frequency converter 10 to the DC intermediate circuit of the frequency converter 10, from where the power is supplied onwards to the electricity distribution network 1 of the building with the network inverter rectifier. In addition, an IGBT transistor of a controllable brake chopper connected in series with a power resistor 8 is connected between the intermediate circuit busbars of the positive and negative voltage potential of the DC intermediate circuit of each frequency converter 10. When the IGBT transistor of the brake chopper is switched into a conductive state, electric current starts to flow through the power resistor 8 between the intermediate circuit busbars, in which case the power flowing in the direct-current intermediate circuit of the frequency converter 10 starts to be converted into heat in the power resistor 8. In each frequency converter 10 both the current supply of the power resistor 8 as well as also the power flow between the electricity distribution network 1 of the building and the hoisting machine 3 of the elevator is adjusted with the control unit 7 of the frequency converter.

Electricity is also supplied via the electricity distribution network 1 of the building to all the loads 12 of the building that are external to the elevator system. These types of loads 12 external to the elevator system to be connected to the electricity distribution network 1 of the building are e.g. a lighting system, heating system, air-conditioning and security systems of the building and the control systems of users of the building; additionally, in large buildings the aforementioned loads can be e.g. travelators and escalators. The electricity distribution network 1 of the building is connected to the public electricity network 2 via the main board of the building. The fuses of the main board determine the limit value $P_{glim}$ of the maximum permitted power to be supplied between the public electricity network 2 and the electricity distribution network 1 of the building.

The electrical power system comprises a control unit 6 of the elevators, which is fitted to determine the limit value $P_{lim}$ for net power flowing via the interface between the electricity distribution network 1 of the building and the frequency converters 10. For this purpose the control unit 6 of the elevators determines the power-handling capacity $P_{available}$, available to the elevators, of the electricity distribution network 1 of the building.

Figure 3:
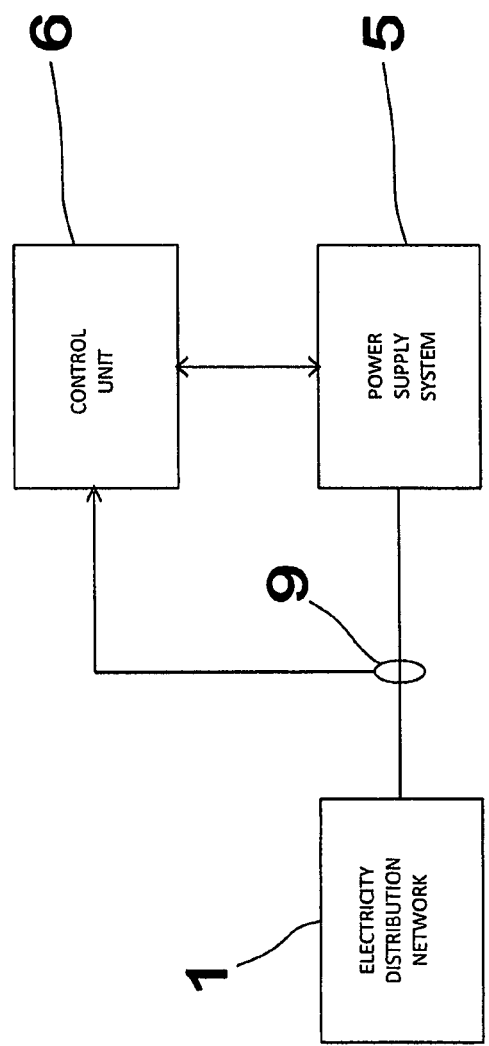
FIG. 3 presents as a block diagram one arrangement according to the invention for determining the limit value for the net power flowing via the interface between the electricity distribution network of a building and the power supply system.

FIG. 3 presents one possible arrangement applicable to the embodiment of FIG. 1 for determining the power-handling capacity $P_{available}$, available to the elevators, of the electricity distribution network 1 of the building. The control unit 6 of the elevators receives from the power supply system 5, from the control units 7 of the frequency converters, information about the instantaneous value of the power flowing via each network inverter rectifier of a frequency converter via a data transfer channel made between the control unit 6 and the control units 7 of the frequency converter. The control unit 6 of the elevators determines the value $P_{net}$ of the net power flowing via the interface between the electricity distribution network 1 of the building and the frequency converters 10. The value $P_{net}$ of net power is formed from the resultant, i.e. from the vector sum, of the instantaneous powers flowing in the network inverter rectifiers of the frequency converters, when calculating which resultant the direction and magnitude of the components of the power flow are taken into account according to FIG. 1, e.g. such that the value of the component of power flow directed from the network inverter rectifier of the frequency converter 10 to the electricity distribution network 1 of the building is positive, and the value of the component of power flow directed from the electricity distribution network of the building to the network inverter rectifier is negative. In addition, the control unit 6 of the elevators measures the voltage of the electricity distribution network 1 of the building with a sensor 9, such as with a measuring resistor or measuring transformer. If the voltage of the electricity distribution network 1 of the building starts to increase from its nominal value, the control unit 6 sets the power-handling capacity $P_{available}$, available to the elevators, of the electricity distribution network 1 of the building for the flow of net power directed from the frequency converters 10 towards the electricity distribution network of the building such that the power-handling capacity $P_{available}$ is smaller by the amount A of net power $P_{net}$ flowing at the time of the increase of the voltage from the frequency converters 10 towards the electricity distribution network 1 of the building:

$$P_{available} = P_{net} - A$$

The control unit 6 of the elevators sets the limit value $P_{lim}$ for net power flowing from the frequency converters 10 towards the electricity distribution network 1 of the building to be the same as the aforementioned power-handling capacity $P_{available}$, available to the elevators, of the electricity distribution network 1 of the building, with which limit value the voltage of the electricity distribution network of the building returns to its nominal value:

$$P_{lim} = P_{available}$$

The limit value $P_{lim}$ for net power flowing via the interface between the electricity distribution network 1 of the building and the frequency converters 10 can also be set to be slightly smaller than the power-handling capacity $P_{available}$, available to the elevators, of the electricity distribution network 1 of the building, in which case the probability of overloading of the electricity distribution network 1 of the building decreases.

The control unit 6 of the elevators determines for each frequency converter 10 an individual limit value $P_{limi}$ for power supply such that the total of the limit values $P_{limi}$ for the power supply of different frequency converters 10 form the limit value $P_{lim}$ for net power flowing via the interface between the aforementioned electricity distribution network 1 of the building and the frequency converters 10 towards the electricity distribution network 1 of the building:

$$P_{lim} = \sum_{i=1}^{N} P_{limi},$$

where N is the number of frequency converters/limit values.

The control unit 6 of the elevators notifies each of the frequency converters 10 of the individual limit value $P_{limi}$ for power supply; the mutual magnitudes of the limit values can be determined between the different frequency converters. e.g. on the basis of the rated powers of the elevators, on the basis of the traffic flows of the elevators, on the basis of the time of day, et cetera. Each control unit 7 of a frequency converter 10 controls the brake chopper of a frequency converter such that the brake chopper consumes the part of the power $P_i$ that flows to the DC intermediate circuit of the frequency converter via the inverter from the hoisting machine 3 of the elevator and that exceeds the limit value $P_{limi}$ for the power supply of the frequency converter in question as heat $P_{termi}$ in the power resistor 8 connected to the DC intermediate circuit:

$$P_{termi} = P_i - P_{limi}$$

The embodiment of the invention described above can also be implemented in an alternative way e.g. such that when the control unit 6 of the elevators detects a rise in the voltage of the electricity distribution network 1 of the building it communicates the information about the rise in voltage to the control units 7 of the frequency converters, which limit the power flow occurring from the frequency converter 10 via the network inverter rectifier to the electricity distribution network of the building from its current value e.g. to a proportional stepped increase in voltage such that the power flow is more limited the greater the rise in voltage detected in the electricity distribution network of the building. On the other hand, each of the frequency converters can also independently determine an increase in the voltage of the electricity distribution network of the building e.g. from the modulation index of the network inverter rectifier or with a separate voltage measuring sensor and can also independently limit the power flow occurring via the network inverter rectifier to the electricity distribution network 1 of the building, in which case a control unit 6 is not necessarily needed.

Figure 4:
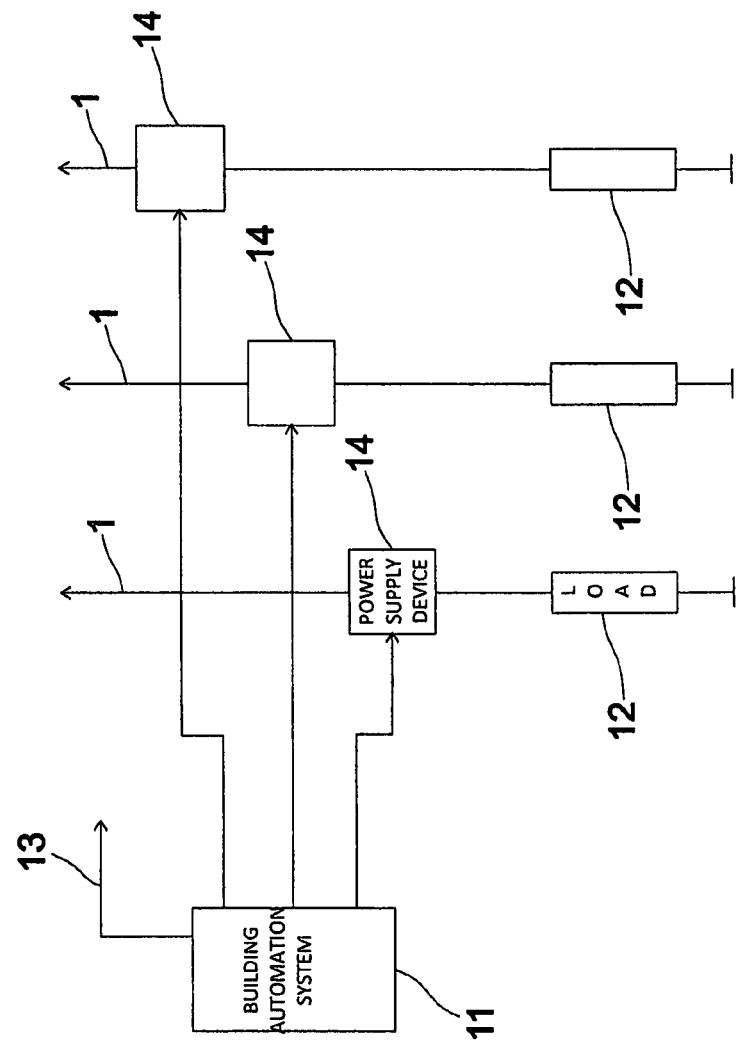
FIG. 4 presents as a block diagram one arrangement according to the invention for determining the load rate of the electricity distribution network of a building

FIG. 4 presents one alternative solution that is also applicable to the embodiment of FIG. 1 for determining the power-handling capacity $P_{available}$, available to the elevators, of the electricity distribution network 1 of the building. In this arrangement the building automation system 11 controls the electricity supply to the loads 12 that are external to the elevator system and that are to be connected to the electricity distribution network 1 of the building with separate power supply devices 14, such as with relays, contactors, frequency converters, AC/DC converters and corresponding. The building automation system determines the vector sum of power consumptions $P_{Li}$, i.e. the net power consumption $P_L$, of the loads 12 to be connected to the electricity distribution network 1 of the building:

$$P_L = \sum_{i=1}^{M} P_{Li}$$

Where M is the number of loads 12 external to the elevator system that are to be connected to the electricity distribution network 1 of the building.

The information collected by the building automation system 11 about the degree of loading of the electricity distribution network 1 of the building is used here for determining the power-handling capacity $P_{available}$, available to the elevators, of the electricity distribution network 1 of the building. For this reason a data transfer channel is made between the control unit 6 of the elevators and/or the control units 7 of the frequency converters for communicating information about the degree of loading of the electricity distribution network 1 of the building from the building automation system 11 to the control unit 6 of the elevators and/or to the control units 7 of the frequency converters.

When the positive travel directions of the power flows are selected to be in the direction of the arrows marked in FIG. 1, the following equation regarding the power flow directed from the frequency converters 10 towards the electricity distribution network of the building is obtained for the power-handling capacity $P_{available}$, available to the elevators, of the electricity distribution network 1 of the building:

$$P_{available} = P_{glim} + P_L$$

Embodiment 2

Figure 2:
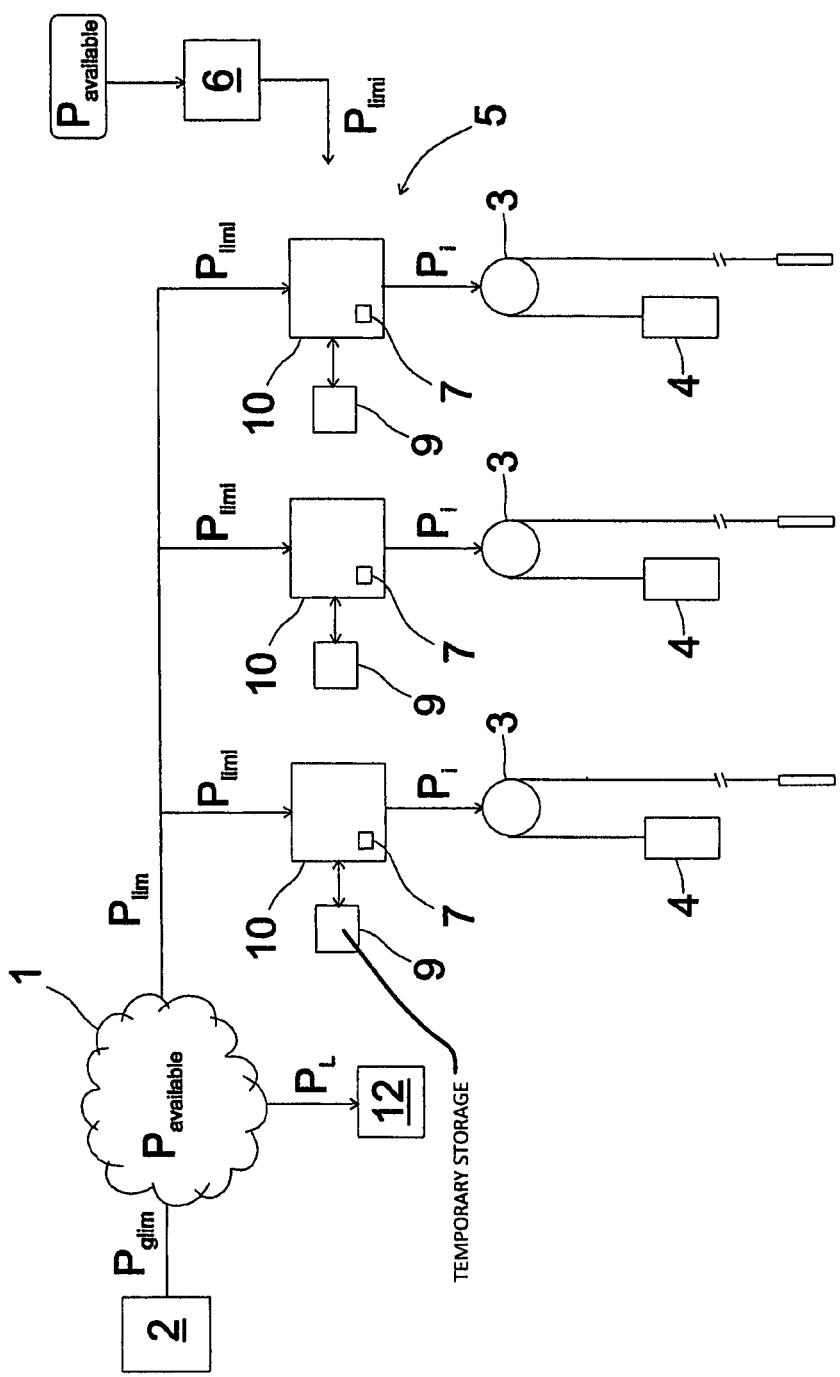
FIG. 2 presents as a block diagram one electrical power system according to a second embodiment of the invention

The electrical power system presented in FIG. 2 comprises a number of high-powered elevators. In each of the elevators an elevator car 4 and a counterweight are suspended in the elevator hoistway with elevator ropes, a belt or corresponding passing via the traction sheave of the hoisting machine 3 of the elevator. The elevator car 4 is moved with the hoisting machine 4 of the elevator. An induction motor or synchronous motor, for example, such as a permanent-magnet synchronous motor in which rotor excitation is implemented with permanent magnets, can be used as the power-producing part of the hoisting machine. The power supply to the aforementioned power-producing part of the hoisting machine 3 of the elevator occurs with frequency converters 10 from the electricity distribution network 1 of the building. Each frequency converter comprises an interface to the hoisting machine 3 of the elevator and to the electricity distribution network 1 of the building. The frequency converters 10 are of the type that brake to the network and for this reason they comprise a network inverter rectifier. Each of the frequency converters 10 is connected between the hoisting machine 3 of the elevator and the electricity distribution network 1 of the building such that power can be supplied with a frequency converter 10 in both directions between the electricity distribution network 1 of the building and the hoisting machine of the elevator. When the elevator drives in the light direction power flows from the hoisting machine 3 of the elevator via the inverter of the frequency converter 10 to the DC intermediate circuit of the frequency converter 10, from where the power is supplied onwards to the electricity distribution network 1 of the building with the network inverter rectifier. Additionally, in this embodiment of the invention a temporary storage 9 of energy is connected in connection with the DC intermediate circuit of each frequency converter 10. The temporary storage 9 of energy comprises e.g. a supercapacitor and/or a lithium-ion accumulator and/or a flywheel, and it is connected to the DC intermediate circuit of the frequency converter with a DC/DC converter. The DC/DC converter comprises a controllable solid-state switch, by switching which power is supplied between the temporary storage 9 of energy and the DC intermediate circuit of the frequency converter 10. In each frequency converter 10 both the power supply between the temporary storage of energy and the frequency converter as well as the power flow between the electricity distribution network 1 of the building and the hoisting machine 3 of the elevator are adjusted with the control unit 7 of the frequency converter.

Electricity is also supplied via the electricity distribution network 1 of the building to all the loads 12 of the building that are external to the elevator system. These types of loads 12 external to the elevator system to be connected to the electricity distribution network 1 of the building are e.g. a lighting system, heating system, air-conditioning and security systems of the building and the control systems of users of the building; additionally, in large buildings the aforementioned loads can be e.g. travelators and escalators. The electricity distribution network 1 of the building is connected to the public electricity network 2 via the main board of the building. The fuses of the main board determine the limit value $P_{glim}$ of the maximum permitted power to be supplied between the public electricity network 2 and the electricity distribution network 1 of the building.

The electrical power system comprises a control unit 6 of the elevators, which unit is fitted to determine the limit value $P_{lim}$ for net power flowing via the interface between the electricity distribution network 1 of the building and the frequency converters 10. For this purpose the control unit 6 of the elevators determines the power-handling capacity $P_{available}$, available to the elevators, of the electricity distribution network 1 of the building.

FIG. 3 presents one possible arrangement applicable to the embodiment of FIG. 2 for determining the power-handling capacity $P_{available}$, available to the elevators, of the electricity distribution network 1 of the building. The control unit 6 of the elevators receives from the power supply system 5, from the control units 7 of the frequency converters, information about the instantaneous value of the power flowing via each network inverter rectifier of a frequency converter via a data transfer channel made between the control unit 6 and the control units 7 of the frequency converter. The control unit 6 of the elevators determines the value $P_{net}$ of net power flowing via the interface between the electricity distribution network 1 of the building and the frequency converters 10. The value $P_{net}$ of net power is formed from the resultant, i.e. from the vector sum, of the instantaneous powers flowing in the network inverter rectifiers of the frequency converters, when calculating which resultant the direction and magnitude of the components of the power flow are taken into account according to FIG. 2 e.g. such that the value of the component of power flow directed from the network inverter rectifier of the frequency converter 10 to the electricity distribution network 1 of the building is negative and the value of the component of power flow directed from the electricity distribution network of the building to the network inverter rectifier is positive. In addition, the control unit 6 of the elevators measures the voltage of the electricity distribution network 1 of the building with a sensor 9, such as with a measuring resistor or a measuring transformer. If the voltage of the electricity distribution network 1 of the building starts to increase from its nominal value, the control unit 6 sets the power-handling capacity $P_{available}$, available to the elevators, of the electricity distribution network 1 of the building for the flow of net power directed from the frequency converters 10 towards the electricity distribution network of the building such that the power-handling capacity $P_{available}$ is smaller by the amount A of net power $P_{net}$ flowing at the time of the increase of the voltage:

$$P_{available} = P_{net} - A$$

If the voltage of the electricity distribution network 1 of the building starts to decrease from its nominal value, the control unit 6, on the other hand, sets the power-handling capacity $P_{available}$, available to the elevators, of the electricity distribution network 1 of the building for the flow of net power directed from the electricity distribution network of the building towards the frequency converters 10 such that the power-handling capacity $P_{available}$ is smaller by the amount A of net power $P_{net}$ flowing at the time of the increase of the voltage:

$$P_{available} = P_{net} - A$$

The control unit 6 of the elevators sets the limit value $P_{lim}$ for the flow of net power directed from the electricity distribution network 1 of the building towards the frequency converters 10 or the limit value $P_{lim}$ for the flow of net power directed from the frequency converters 10 towards the electricity distribution network of the building to be the same as the power-handling capacity $P_{available}$ in question, available to the elevators, of the electricity distribution network 1 of the building such that when using the limit value $P_{lim}$ the voltage of the electricity distribution network of the building returns to its nominal value:

$$P_{lim} = P_{available}$$

The limit value $P_{lim}$ for net power flowing via the interface between the electricity distribution network 1 of the building and the frequency converters 10 can also be set to be slightly smaller than the power-handling capacity $P_{available}$, available to the elevators, of the electricity distribution network 1 of the building, in which case the probability of overloading of the electricity distribution network 1 of the building decreases.

The control unit 6 of the elevators determines for each frequency converter 10 an individual limit value $P_{limi}$ for power supply such that the total of the limit values $P_{limi}$ for the power supply of different frequency converters 10 form the limit value $P_{lim}$ for net power flowing via the interface between the aforementioned electricity distribution network 1 of the building and the frequency converters 10:

$$P_{lim} = \sum_{i=1}^{N} P_{limi},$$

where N is the number of frequency converters/limit values.

The control unit notifies each of the frequency converters 10 of the individual limit value $P_{limi}$ for power supply; the mutual magnitudes of the limit values can be determined between the different frequency converters e.g. on the basis of the rated powers of the elevators, on the basis of the traffic flows of the elevators, on the basis of the state of charge of the temporary storage 9 of energy, on the basis of the time of day, et cetera. Each control unit 7 of a frequency converter 10 controls the power flow between the temporary storage 9 of energy and the DC intermediate circuit of the frequency converter such that either the part of the power $P_i$ that flows to the DC intermediate circuit of the frequency converter via the inverter from the hoisting machine 3 of the elevator and that exceeds the limit value $P_{limi}$ for the power supply of the frequency converter in question is supplied to the temporary storage 9 of energy or such that the part of the power $P_i$ that flows via the inverter to the hoisting machine 3 of the elevator via the inverter and that exceeds the limit value $P_{limi}$ for the power supply of the frequency converter in question is supplied from the temporary storage 9 of energy. It should be noted here that the limit value $P_{limi}$ for the power supply of a frequency converter is dependent on direction such that the limit value $P_{limi}$ for the power supply of a frequency converter derived from the limit value $P_{lim}$ for the flow of net current directed from the electricity distribution network 1 of the building towards the frequency converters 10 only limits the power flow directed from a frequency converter towards a hoisting machine 3 of the elevator; likewise the limit value $P_{limi}$ for the power supply of a frequency converter derived from the limit value $P_{lim}$ for the flow of net current directed from the frequency converters 10 towards the electricity distribution network of the building only limits the power flow directed from a hoisting machine 3 of the elevator towards a frequency converter.

The embodiment of the invention described above can also be implemented in an alternative manner, e.g. such that when the control unit 6 of the elevators detects a rise/fall in the voltage of the electricity distribution network 1 of the building the control unit 6 communicates the information about the rise/fall in voltage to the control units 7 of the frequency converters, which limit the power flow occurring via the interface between the electricity distribution network 1 of the building and a frequency converter 10 e.g. to a proportional stepped rise/fall of the voltage such that the power flow is more limited from its current value the greater the rise/fall in voltage detected in the electricity distribution network of the building. On the other hand, each of the frequency converters can also independently determine the voltage of the electricity distribution network of the building e.g. from the modulation index of the network inverter rectifier or with a separate voltage measuring sensor and can also independently limit the power flow occurring via the network inverter rectifier to the electricity distribution network of the building/from the electricity distribution network 1 of the building, in which case a control unit 6 is not necessarily needed.

FIG. 4 presents one alternative solution that is applicable to the embodiment of FIG. 2 for determining the power-handling capacity $P_{available}$, available to the elevators, of the electricity distribution network 1 of the building. In this arrangement the building automation system 11 controls the electricity supply to the loads 12 that are external to the elevator system and that are to be connected to the electricity distribution network 1 of the building with separate power supply devices 14, such as with relays, contactors, frequency converters, AC/DC converters and corresponding. The building automation system determines the vector sum of power consumptions $P_{Li}$, i.e. the net power consumption $P_L$, of the loads 12 to be connected to the electricity distribution network 1 of the building:

$$P_L = \sum_{i=1}^{M} P_{Li}$$

Where M is the number of loads 12 external to the elevator system that are to be connected to the electricity distribution network 1 of the building.

The information collected by the building automation system 11 about the aforementioned degree of loading of the electricity distribution network 1 of the building is used here for determining the power-handling capacity $P_{available}$, available to the elevators, of the electricity distribution network 1 of the building. For this reason a data transfer channel is made between the control unit 6 of the elevators and/or the control units 7 of the frequency converters and the building automation system 11 for communicating information about the degree of loading of the electricity distribution network 1 of the building from the building automation system 11 to the control unit 6 of the elevators and/or to the control units 7 of the frequency converters.

When the positive travel directions of the power flows are selected to be in the direction of the arrows marked in FIG. 2, the following equation regarding the power flow directed from the frequency converters 10 towards the electricity distribution network of the building is obtained for the power-handling capacity $P_{available}$, available to the elevators, of the electricity distribution network 1 of the building:

$$P_{available} = P_{glim} + P_L$$

In addition, the following equation regarding the power flow directed from the electricity distribution network 1 of the building towards the frequency converters 10 is obtained for the power-handling capacity $P_{available}$, available to the elevators, of the electricity distribution network 1 of the building:

$$P_{available} = P_{glim} - P_L$$

The invention is not only limited to be applied to the embodiments described above, but instead many variations are possible within the scope of the inventive concept defined by the claims below.

In the embodiments described above the various power supply units as well as the power supply cables are described as lossless; it is obvious to a person skilled in the art that in practical applications also changes to the power flow caused by power losses must be taken into account for the specific application.

The invention claimed is:

1. An electrical power system for operating elevators, the electrical power system comprising:
   a plurality of hoisting machines of an elevator, each of the plurality of hoisting machines moving an elevator car in an elevator hoistway; and
   a power supply system that interfaces with an electricity distribution network of a building to transfer power between the plurality of hoisting machines and the electricity distribution network, the power supply system including a control apparatus that determines a power-handling capacity of the electricity distribution network available to the elevators; wherein
   the power supply system limits a net power flowing from the plurality of hoisting machines to the electricity distribution network to a limit value for net power determined based on the power-handling capacity of the electricity distribution network available to the elevators, and
   the electricity distribution network of the building provides power to loads external to the elevator system.

2. The electrical power system according to claim 1, wherein the control apparatus determines the limit value for net power based on the net power flowing between the power supply system and the electricity distribution network.

3. The electrical power system according to claim 1, wherein the power supply system further comprises:

a plurality of power resistors; and a plurality of controllable brake choppers; wherein each of the plurality of controllable brake choppers supplies electricity via the plurality of power resistors, and the plurality of brake choppers consume a portion of the net power that flows from the plurality of hoisting machines of the elevator to the power supply system and that exceeds the limit value as heat in the power resistors.

4. The electrical power system according to claim 1, wherein the control apparatus comprises:

a voltage measurement device that measures a voltage of the electricity distribution network; wherein the control apparatus determines the power-handling capacity of the electricity distribution network available to the elevators based on the measured voltage of the electricity distribution network.

5. The electrical power system according to claim 4, wherein the power supply system limits a net power flowing from the power supply system to the electricity distribution network based on an increase in the voltage of the electricity distribution network.

6. The electrical power system according to claim 4, wherein the power supply system limits a net power flowing from the electricity distribution network to the power supply system based on a decrease in the voltage of the electricity distribution network.

7. The electrical power system according to claim 1, wherein the power supply system comprises:

a plurality of temporary storages of energy; wherein the power supply system supplies, to the plurality of temporary storages of energy, a portion of the power that flows from the plurality of hoisting machines of the elevator to the power supply system and that exceeds the limit value for net power.

8. The electrical power system according to claim 7, wherein the power supply system supplies, from the plurality of temporary storages of energy, the portion of the power that flows from the power supply system to the hoisting machines of the elevator and that exceeds the limit value for net power.

9. The electrical power system according to claim 1, wherein the power supply system comprises:

a plurality of power supply devices, each of the power supply devices interfacing with the electricity distribution network to transfer power between a corresponding hoisting machine and the electricity distribution network.

10. The electrical power system according to claim 9, wherein each of the plurality of power supply devices comprises:

a power resistor; and a controllable brake chopper that supplies electricity via the power resistor; wherein the power supply device controls the brake chopper, such that the brake chopper consumes, as heat in the power resistor, a portion of the power that flows from a hoisting machine of the elevator to the power supply device and that exceeds the limit value for power supply applicable to the power supply device.

11. The electrical power system according to claim 9, wherein each of the plurality of power supply devices comprises:

a temporary storage of energy;

a controllable solid-state switch that adjusts the power flow of the temporary storage of energy; wherein the power supply device controls the solid-state switch to supply, at least one of to and from the temporary storage of energy, the portion of the power that flows between a hoisting machine of an elevator and a power supply device and that exceeds the limit value for power supply applicable to the power supply device.

12. The electrical power system according to claim 9, wherein each of the plurality of power supply devices is a frequency converter including a network inverter rectifier.

13. The electrical power system according to claim 9, wherein the control apparatus comprises:

a control unit connected to the plurality of power supply devices; wherein the control unit determines the power-handling capacity of the electricity distribution network available to the elevators, the control unit determines the limit value for net power flowing via the first interface based on the power-handling capacity, the control unit sets, for each of the plurality of power supply devices, a limit value for power supply such that the limit values for the power supply of the different power supply devices in total are less than the limit value for net power, the control unit notifies each of the plurality of power supply devices of the limit value for an applicable power supply, and each of the plurality of power supply devices limits the power flow between the electricity distribution network and a hoisting machine to the notified limit value for power supply determined by the control unit for that power supply device.

14. The electrical power system according to claim 13, wherein the control unit determines, for each of the plurality of power supply devices, an individual limit value for power supply, and wherein the control unit notifies each of the plurality of power supply devices of the individual limit value for power supply applicable to that power supply device.

15. The electrical power system according to claim 13, wherein the control unit is in the control center of the elevators.

16. The electrical power system according to claim 1, wherein the power supply system comprises:

a plurality of power supply devices, each of the plurality of power supply devices interfacing with the electricity distribution network to transfer power between a corresponding hoisting machine of the elevator and the electricity distribution network, wherein each of the plurality of power supply devices determines the power-handling capacity of the electricity distribution network available to the elevators, and each of the plurality of power supply devices determines the limit value for net power flowing via the first interface based on the power-handling capacity of the electricity distribution network available to the elevators.

17. The electrical power system according to claim 1, wherein the control apparatus is connected to a building automation system, and wherein the building automation system communicates information about the degree of loading of the electricity distribution network to the control apparatus via the connection between the control apparatus and the building automation system.

18. The electrical power system according to claim 1, wherein the electricity distribution network is connected to loads that are external to the elevator.

19. The electrical power system according to claim 1, wherein the electricity distribution network is connected to a public electricity distribution network.

20. The electrical power system according to claim 19, wherein the power-handling capacity of the electricity distribution network available to the elevators is determined based on a limit value for maximum permitted power to be supplied between the public electricity network and the electricity distribution network as well as based on a net power consumption of loads to be connected to the electricity distribution network.

21. The electrical power system according to claim 19, wherein the electricity distribution network is connected to the public electricity network via a main board, and wherein fuses of the main board are configured to determine the limit value of the maximum permitted power to be supplied between the public electricity network and the electricity distribution network.

22. The electrical power system of claim 1, further comprising:
   the electricity distribution network of the building that interfaces with a public electricity network.

* * * * *